United States Patent
Blitz

(10) Patent No.: US 7,099,668 B2
(45) Date of Patent: Aug. 29, 2006

(54) POSITION-DEPENDENT CONTROL OF FEATURES OF A COMMUNICATIONS SYSTEM

(75) Inventor: Andre Blitz, München (DE)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 10/343,797

(22) PCT Filed: Jul. 26, 2001

(86) PCT No.: PCT/DE01/02842

§ 371 (c)(1),
(2), (4) Date: Feb. 4, 2003

(87) PCT Pub. No.: WO02/13562

PCT Pub. Date: Feb. 14, 2002

(65) Prior Publication Data

US 2004/0198388 A1   Oct. 7, 2004

(30) Foreign Application Priority Data

Aug. 4, 2000 (DE) ................................ 100 38 259

(51) Int. Cl.
*H04Q 7/20* (2006.01)
(52) U.S. Cl. ..................... 455/440; 455/456.3
(58) Field of Classification Search ............. 455/456.3, 455/456, 440
See application file for complete search history.

(56) References Cited

U.S. PATENT DOCUMENTS

| | | | |
|---|---|---|---|
| 5,555,376 A | 9/1996 | Theimer et al. | |
| 5,590,174 A | 12/1996 | Tsuji et al. | |
| 5,594,611 A | 1/1997 | Consiglio et al. | |
| 5,826,191 A | 10/1998 | Krishnan | |
| 6,505,046 B1 * | 1/2003 | Baker | 455/456.3 |
| 6,711,408 B1 * | 3/2004 | Raith | 455/440 |
| 2002/0032035 A1 * | 3/2002 | Teshima | 455/456 |

FOREIGN PATENT DOCUMENTS

| | | |
|---|---|---|
| WO | WO 94/29995 | 12/1994 |
| WO | WO 97/43864 | 11/1997 |
| WO | WO 98/26620 | 6/1998 |
| WO | WO 99/41927 | 8/1999 |

OTHER PUBLICATIONS

Patent Abstracts of Japan, Publication No.: 09307938 A, Publication Date: Nov. 28, 1997.
Patent Abstracts of Japan, Publication No.: 00138964 A, Publication Date: May 16, 2000.

* cited by examiner

*Primary Examiner*—William D. Cumming
(74) *Attorney, Agent, or Firm*—Staas & Halsey LLP

(57) ABSTRACT

Features, especially of a call diversion feature, of a communications system are automatically controlled according to the position of a mobile terminal. The mobile terminal can be treated to a certain extent as an indicator of the position of a user carrying the mobile terminal with him/her. The position of the mobile terminal is determined by a global positioning system of the mobile terminal and is compared with a stored reference position. One or more features of the communications system are then controlled according to the results of this comparison.

15 Claims, 2 Drawing Sheets

POSITION-DEPENDENT CONTROL OF FEATURES OF A COMMUNICATIONS SYSTEM

CROSS REFERENCE TO RELATED APPLICATIONS

Figure 1:
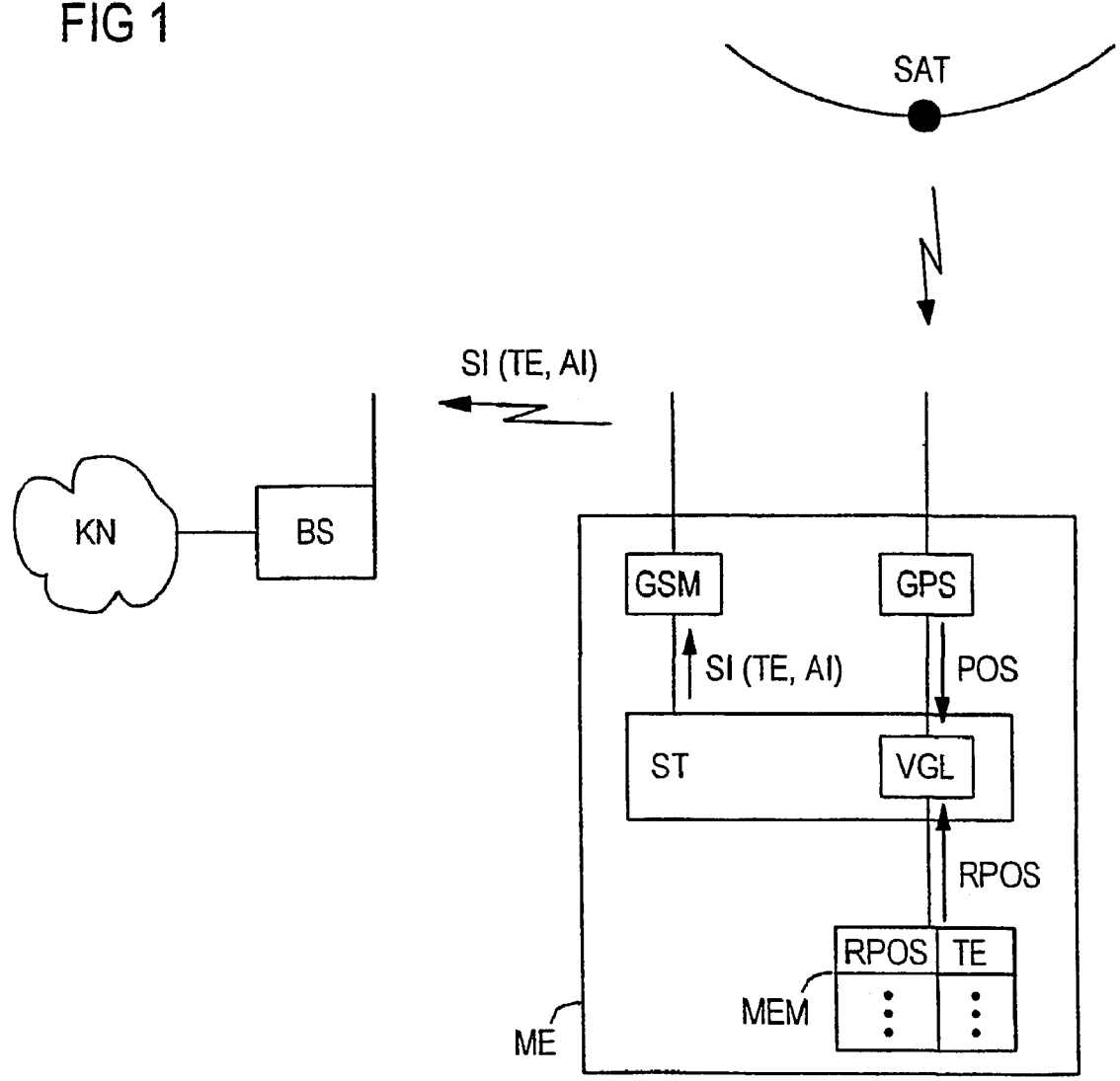

This application is based on and hereby claims priority to PCT Application No. PCT/DE01/02842 filed on Jul. 26, 2001 and German Application No. 100 38 259.2 filed on Aug. 4, 2000, the contents of which are hereby incorporated by reference.

BACKGROUND OF THE INVENTION

Contemporary communications systems, e.g. for voice, video and/or data communication, frequently have a multiplicity of features such as, for example, call diversion, call forwarding and group call. To set up or activate such features, however, time-consuming and complicated user inputs are frequently required. In the text which follows, this will be illustrated on the example of setting up a call diversion.

Call diversion is frequently used for diverting calls which are directed to a terminal located at the workstation of a user to another terminal when the user leaves his workstation. For this purpose, the user must activate a corresponding call diversion in a feature control of the communication system every time he leaves his workstation. The user can determine as destination for the diversion, e.g. a mobile or cordless terminal carried by him, a voice box or a terminal of a colleague. When call diversion is activated, the communication system then signals the calls arriving for the terminal at the workstation at the terminal intended as destination for the diversion. When the user returns to his workstation, the user must again explicitly deactivate the call diversion so that incoming calls are again switched to the terminal of the workstation. The user inputs to be made for activating and deactivating a call diversion every time he leaves and, respectively, returns to the workstation are very time-consuming. In addition, there is a risk that the user forgets to activate the call diversion, for example when he leaves his workstation, and, in consequence, is temporarily not available for incoming calls.

Other features of a communications system also require similar cumbersome user inputs, particularly when the user changes location.

It is one possible object of the present invention to specify a method which allows automatic and demand-oriented controlling of features of a communication system. It could also be an object of the present invention to specify a mobile terminal and a base station for implementing the method.

The proposed method and device provide for the automatic controlling of features, e.g. for a call diversion, a call forwarding, a group call, a call back, appointment signaling and/or an internet access, of a communication system in dependence on a position of a mobile terminal. The mobile terminal can be considered to a certain extent as an indicator of where a user carrying the mobile terminal is located. The position of the mobile terminal is determined by a satellite navigation receiver of the mobile terminal and compared with a stored reference position. Following this, one or more features of the communication system are controlled in dependence on the result of the comparison.

In the text which follows, a mobile terminal is also understood as meaning what is known as a cordless terminal. The invention is essentially independent of the wireless communication method used by the mobile terminal and its base station. For example, a mobile terminal according to what is known as the Bluetooth, DECT or GSM standard can be used.

Controlling a feature can comprise, e.g. setting up, configuring, activating or deactivating the feature. Thus, for example, a feature which relates to a landline network terminal on the desk of the user can be activated when the user with his mobile terminal leaves a predetermined area around his desk. For this purpose, this area must first be stored as reference position.

The comparison of the position determined with the stored reference position and the controlling of the feature can be carried out by the mobile terminal or, as an alternative, by a base station of the mobile terminal. In the last-mentioned alternative, the position of the mobile terminal, determined by satellite navigation receiver, must be transmitted by the terminal to the base station. Carrying out the comparison and the controlling of the feature by the mobile terminal has the advantage that no intervention is required at the base station for implementing the method. By comparison, the alternative embodiment of the comparison and of the controlling of the feature by the base station has the advantage that the method can be implemented with any mobile terminal equipped with a satellite navigation receiver, the position of which can be interrogated by the base station.

In a particularly advantageous manner, the method can be used for the position-dependent controlling of a call diversion. Thus, for example, a call diversion for a landline network terminal on the desk of the user can be activated when the user with his mobile terminal leaves a predetermined area around his desk. The call diversion to be activated can lead to any second terminal such as, for example, the mobile terminal itself, to a voice box, to a terminal of a colleague, to a home connection of the user or to another mobile terminal of the user. The last-mentioned example, a call diversion control can be used for implementing what is known as roaming to another mobile terminal which can also belong to another radio network and the mobile terminal used as the position indicator.

The comparison of the position found for the mobile terminal with the reference position can be carried out in a particularly simple manner by determining the distance between the position of the mobile terminal and the reference position. Furthermore, a frame of values for the distance determined can be predetermined and when this is exceeded, control of the feature is initiated. As a frame of values, for example, the distance at which a user can still audibly perceive any ringing of his desk telephone can be predetermined. When this distance is exceeded, a call diversion from the desk telephone to the mobile terminal can then be automatically activated. In addition, further frames of values can be predetermined for the distance between position found and the reference position in order to control features, as required, when a user with his mobile terminal leaves or enters, e.g. the grounds of his company, a city or a country.

Figure 2:
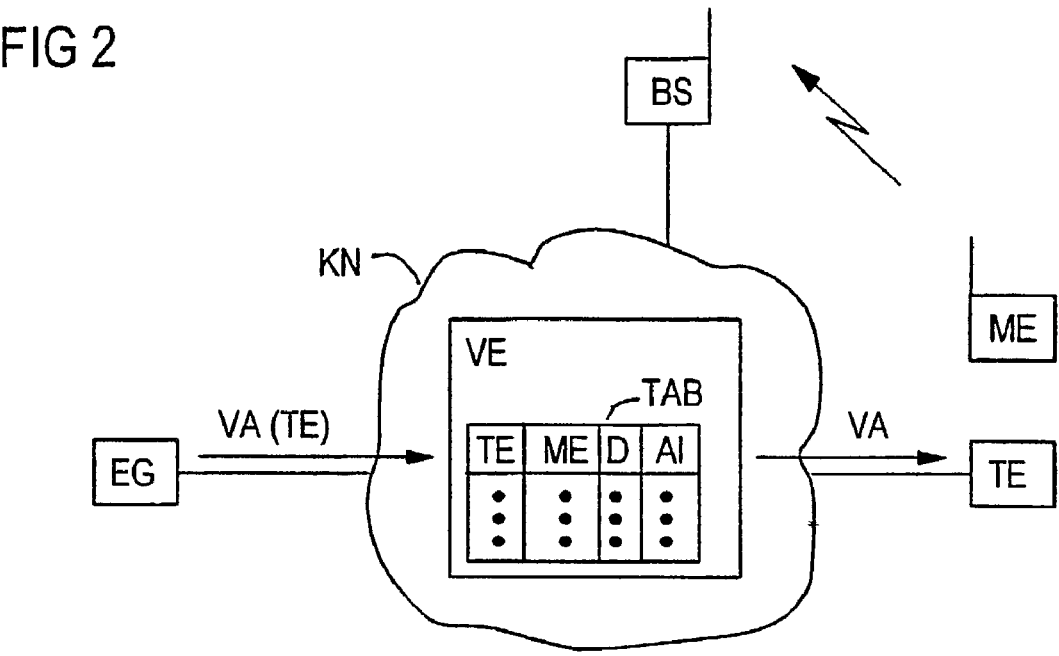
Figure 3:
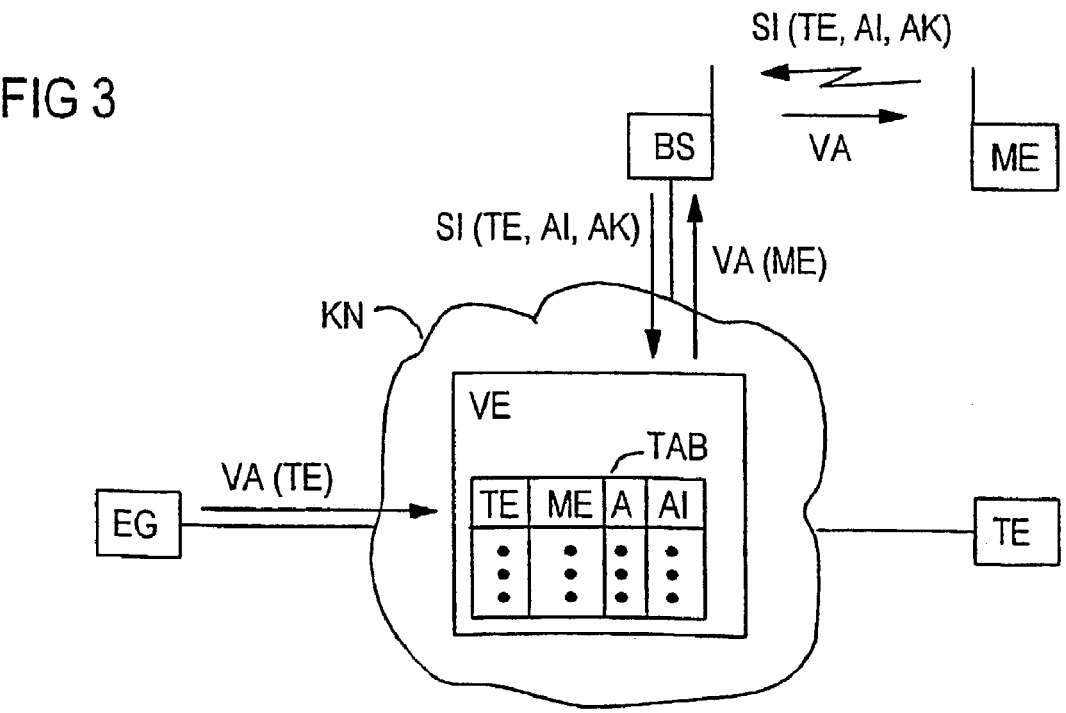

In the test which follows, an exemplary embodiment will be explained in greater detail with reference to the drawing, in which, in each case in diagrammatic representation, FIG. 1 shows a mobile terminal for the position-dependent controlling of a call diversion, FIG. 2 shows a communication system, comprising the mobile terminal and a switching system, with a call diversion set up but not activated, and FIG. 3 shows the same communication system with the call diversion activated.

In FIG. 1, a mobile terminal ME is shown diagrammatically which is wirelessly coupled to a public or private communication network KN via a base station BS. The mobile terminal ME has a GSM transceiver module GSM (Global System for Mobile communication), a GPS receiver GPS (Global Positioning System), a central processor ST and a memory MEM as functional components. The central processor, in turn, contains a comparison device VGL which is preferably implemented by a comparison routine running on a system processor of the central processor ST. The GSM transceiver module GSM, the GPS receiver GPS and the memory MEM are connected to the central processor ST. A GSM air interface to the base station BS is implemented by the GSM transceiver mobile GSM. As an alternative, the mobile terminal ME could also be coupled to the base station BS via a UMTS (Universal Mobile Telecommunication Service), DECT (Digital Enhanced Cordless Telephony) or a Bluetooth air interface by a corresponding UMTS, DECT or Bluetooth transceiver module.

The GPS receiver GPS is used for receiving and evaluating navigation signals which are radiated worldwide by navigation satellites SAT located in earth orbit. Evaluation of the navigation signals by the GPS receiver allows the global position of the mobile terminal ME to be determined.

The memory MEM contains one or more entries in which in each case a terminal, in this case a desk terminal TE, is associated with a reference position RPOS stored in GPS coordinates. The stored information identifying the respective terminal can be, e.g. its directory number. In FIG. 1, only a single stored reference position RPOS is explicitly shown for reasons of clarity. In the present exemplary embodiment, it designates the position of the desk terminal TE. In principle, however, the reference position RPOS is not tied to a position of a terminal but, instead, can be freely predetermined by a user. A reference position RPOS can be predetermined, e.g. by a current position of the mobile terminal ME, determined by the GPS receiver GPS, being accepted as reference position RPOS and stored in a memory MEM on the initiative of the user. As an alternative, the reference position RPOS can also be input explicitly, e.g. in the form of GPS coordinates, by a user at the mobile terminal ME.

In the present exemplary embodiment, the GPS receiver GPS determines the respective current position POS of the mobile terminal ME at regular time intervals, e.g. at intervals of 30 seconds, and transfer this position POS to the comparison device VGL. The comparison device VGL then compares the position POS of the mobile terminal ME with the stored reference position RPOS. The comparison is made by determining the distance between the current position POS and the reference position RPOS and comparing it with a predetermined limit distance such as, e.g. 50 m. The limit distance can preferably also be stored in a memory MEM, possibly in association with a respective reference position RPOS. Depending on whether the distance found between the current position POS and the reference position RPOS exceeds or drops below the predetermined limit distance, the central processor ST initiates different control processes. In the present exemplary embodiment, the central processor ST activates a call diversion previously set up in communication network KN when the predetermined limit distance is exceeded and deactivates it again when the distance is below this limit distance. For this purpose, the central processor ST generates, in dependence on the result of the comparison between the current position POS and the reference position RPOS associated with a terminal, in this case TE, a control information item SI. The control information item SI contains, among other things, a terminal identification information item identifying the terminal associated with the reference position RPOS, in this case TE, e.g. its directory number, and an authentication information item AI. The authentication information item AI is used for checking the authorization for controlling the call diversion in the communication network KN. In the present exemplary embodiment, the authentication information item AI comprises the directory number of the mobile terminal ME. The control information item SI is transmitted by the central processor ST to the GSM transceiver mobile GSM and from the latter wirelessly to the base station BS and thus into the communication network KN. A control information item SI is preferably formed and transmitted only if the result of the comparison with a limit distance changes compared with the result of the corresponding immediately preceding comparison with this limit distance.

The position-dependent control of the call diversion can be switched on or off by the user of the mobile terminal as required.

FIGS. 2 and 3 in each case show the same communication system, which has the communication network KN, the base station BS, the mobile terminal ME, the desk terminal TE and a further terminal EG in a diagrammatic representation. The base station BS and the terminals EG and TE are in each case connected to the communica-tion network KN. The mobile terminal ME is wirelessly coupled to the base station BS. The position of the desk terminal TE is stored in the mobile terminal ME as the reference position RPOS associated with the desk terminal TE.

The switching system VE contains a call diversion table TAB in which call diversions for any terminals can be entered for the terminals registered with the switching system VE, in this case TE. In the present exemplary embodiment, a call diversion to the mobile terminal ME is entered for the desk terminal TE. To each terminal for which a call diversion is set up, in this case TE, a respective destination terminal, in this case ME, an activation status, in this case A for activated or D for deactivated, and an authentication information item, in this case AI, is allocated in the call diversion table TAB. The switching system VE checks by a respective authentication information AI whether a respective transmitter of a control information item is authorized to control a call diversion for a respective terminal. Control of a call diversion for a terminal is only allowed if the relevant control information item contains the authentication information item allocated to this terminal in the call diversion table TAB.

Setting up a call diversion, i.e. entering a data record in the call diversion table TAB, can be done from the desk terminal TE or from the mobile terminal ME by inputting a diversion destination, in this case ME. When it is entered via the mobile terminal ME, the respective terminal for which the call diversion is to be set up, in this case TE, must be identified, for example by inputting its directory number, in addition to the diversion destination. Furthermore, the reference position RPOS to be allocated to this terminal, in this case TE, must also be defined at the mobile terminal ME. For this purpose, the mobile terminal ME is preferably brought into the vicinity of the desk terminal TE and the position POS of the mobile terminal ME currently determined is stored as reference position RPOS in the memory MEM by a user input reserved for this purpose.

In the present exemplary embodiment, the authentication information item AI includes the directory number of the mobile terminal ME. This means that the call diversion entered for the desk terminal TE can be controlled by control information items SI of the mobile terminal ME.

FIG. 2 shows a situation in which the user with his mobile terminal ME is in the immediate vicinity of the desk terminal TE. The distance between the current position POS and the reference position RPOS allocated to the desk terminal TE, determined by the mobile terminal ME, is less than the predetermined limit distance. In the switching system VE, a call diversion for the desk terminal TE to the mobile terminal ME is set up by a corresponding entry in the call diversion table TAB but initially marked as deactivated by an activation status D allocated to the desk terminal TE.

Since the call diversion set up for the desk terminal TE is deactivated, connection requests VA arriving at the switching system VE and directed to the desk terminal TE by the terminal EG are switched via the switching system VE to the desk terminal TE in accordance with the destination. Since the user with his mobile terminal ME is in the vicinity of the desk terminal TE, the incoming connection requests VA can be accepted by the user at the desk terminal TE.

FIG. 3 illustrates a situation in which the user with his mobile terminal ME is going away from the desk terminal TE. In this situation, the comparison device VGL of the mobile terminal ME finds that the distance between the currently determined position POS of the mobile terminal ME and the reference position RPOS allocated to the desk terminal TE exceeds the predetermined limit distance. In consequence, the central processor ST of the mobile terminal ME forms a control information item SI for activating a call diversion. The call diversion is activated for the terminal, in this case TE, which is allocated to the reference position RPOS, on which the comparison is based, in the memory MEM. The control information item SI formed accordingly comprises a terminal identification information item identifying the desk terminal TE, e.g. its directory number, the authentication information item AI and an activation command AK for activating the call diversion. The control information item SI is wirelessly transmitted by the mobile terminal ME to the base station BS and from the latter to the switching system VE. The switching system VE then finds the entry in the call diversion table TAB which is associated with the desk terminal TE identified by the control information item SI. In the present exemplary embodiment, the entry found relates to the previously deactivated call diversion from the desk terminal TE to the mobile terminal ME. Following this, the authorization for controlling the call diversion is checked by comparing the authentication information item contained in the control information item SI received with the authentication information item stored in the call diversion table TAB. After a successful authorization check, the call diversion is activated by the switching system VE and identified as active by entering the activation status A in the call diversion table TAB. In consequence, subsequent connection requests VA directed to the desk terminal TE by the terminal EG are diverted to the mobile terminal ME by the switching system VE. For this purpose, the switching system VE forwards the connection requests VA—provided with the directory number of the mobile terminal ME as new destination information—to the base station BS. The latter then initiates the further wireless connection set-up to the mobile terminal ME by the new destination information.

If the mobile terminal ME again approaches the desk terminal TE so that the distance between the currently found position POS and the reference position RPOS again drops below the predetermined limit distance, the central processor ST forms a further control information item (not shown) for deactivating the call diversion and transmits it to the switching system VE. The call diversion is thereupon deactivated by the switching system VE and identified as deactivated by entering the activation status D in the call diversion table TAB. In consequence, subsequent connection requests directed to the desk terminal TE by a terminal EG are again forwarded to the desk terminal TE by the switching system VE in accordance with requirements.

The call diversion can be preferably also deactivated when the mobile terminal ME is switched off. In this case, a control information item for deactivating the call diversion is transmitted by the mobile terminal ME to the switching device VE during the switching-off process.

According to an alternative embodiment, a comparison of the current position POS of the mobile terminal ME with a reference position RPOS, and the controlling of the call diversion which depends on this can also be effected by a correspondingly designed base station or switching system. In these cases, the currently found position POS of the mobile terminal ME must be transmitted in each case to this base station or to this switching system, respectively. Correspondingly, the reference positions RPOS and their association with a respective terminal must be stored in this base station or in this switching system, respectively.

Furthermore, the activation status of the call diversion can be interrogated in each case before a position comparison is carried out. The position comparison can then be made in dependence on the activation status found. Thus, when the call diversion is deactivated, a check can be made whether the mobile terminal ME is moving away from the reference position RPOS and when the call diversion is activated, a check can be made whether the mobile terminal ME is approaching the reference position RPOS. A control information item SI is then only formed in each case with a positive result of the check.

Controlling a call diversion does not need to be restricted to its activation or deactivation but can also relate to, for example, a setting-up or configuring of the call diversion or also of any other feature of the switching system. Thus, for example, if the mobile terminal ME finds that it is approaching a predetermined reference position of a further terminal, e.g. the home terminal of the user, a setting-up of a new call diversion to this further terminal can be initiated by the mobile terminal ME. The new diversion destination must then be preferably specified in a control information item formed for setting up the new call diversion by the central processor ST and transmitted to the switching system VE.

The invention has been described in detail with particular reference to preferred embodiments thereof and examples, but it will be understood that variations and modifications can be effected within the spirit and scope of the invention.

The invention claimed is:

1. A method for controlling call diversion and/or call forwarding of call requests directed to a first terminal of a communication system, comprising:
   determining an actual position of a mobile terminal, which is different from the first terminal and which is wirelessly coupled to the communication system, using a satellite navigation receiver;
   comparing the actual position with a stored reference position allocated to the first terminal, to produce a comparison result; and
   controlling the call diversion and/or call forwarding based on the comparison result.

2. The method as claimed in claim 1, wherein
the mobile terminal compares the position with the stored reference position, and
the mobile terminal controls the feature.

3. The method as claimed in claim 1, wherein
the actual position is transmitted by the mobile terminal to a base station coupled to the communication system, and
the base station compares the actual position with the stored reference position and controls the feature.

4. The method as claimed in claim 3, wherein the actual position is updated and transmitted from the mobile terminal to the base station at regular time intervals.

5. The method as claimed in claim 1, wherein for controlling the feature, a control information item is transmitted to a feature controller of the communication system.

6. The method as claimed in claim 1, further comprising, determining the distance between the actual position and the reference position.

7. The method as claimed in claim 6, wherein the feature is controlled when the distance between the actual position and the reference position exceeds a predetermined distance.

8. The method as claimed in claim 7, wherein
different distance ranges are predetermined, and
which feature is controlled depends on which distance range matches the distance between the actual position and the reference position.

9. The method as claimed in claim 8, wherein for controlling the feature, a control information item is transmitted to a feature controller of the communication system.

10. The method as claimed in claim 9, further comprising determining the distance between the actual position and the reference position.

11. The method as claimed in claim 10, wherein the feature is controlled when the distance between the actual position and the reference position exceeds a predetermined distance.

12. The method as claimed in claim 11, wherein
different distance ranges are predetermined, and
which feature is controlled depends on which distance range matches the distance between the actual position and the reference position.

13. A mobile terminal for executing the method claimed in claim 1.

14. A base station for executing the method claimed in claim 1.

15. A method for controlling call requests directed to a first terminal of a communication system, comprising:
determining an actual position of a mobile terminal, which is different from the first terminal and which is wirelessly coupled to the communication system;
determining a difference between the actual position and a stored reference position; and
if the difference between the actual position and the stored reference position is greater than a predetermined distance, sending the call request to a terminal other than the first terminal.

* * * * *